United States Patent
Hor et al.

[11] Patent Number: 6,029,719
[45] Date of Patent: Feb. 29, 2000

[54] FUEL TANK

[75] Inventors: Hartmut Hor, Mannheim; Joachim Heinemann, Gorxheimertal; Jurgen Kriebel, Ittenbach; Axel Wagner, Bonn, all of Germany

[73] Assignees: Firma Carl Freudenberg, Weinherim; Kautex Textron GmbH & Co. KG, Bonn, both of Germany

[21] Appl. No.: 09/059,189

[22] Filed: Apr. 13, 1998

[51] Int. Cl.[7] .................................................. B60K 15/05
[52] U.S. Cl. ........................... 141/348; 141/59; 141/304; 141/305; 141/350; 137/588; 137/589; 220/86.2; 220/746
[58] Field of Search ................................... 141/52, 53, 59, 141/301, 302, 304, 305, 307, 312, 348–350; 137/587–589; 220/86.1, 86.2, 746

[56] References Cited

U.S. PATENT DOCUMENTS

| | | | |
|---|---|---|---|
| 4,131,142 | 12/1978 | Barr et al. | 141/302 |
| 4,715,509 | 12/1987 | Ito et al. | 220/86.2 |
| 4,809,865 | 3/1989 | Mori et al. | 220/86.2 |
| 5,022,433 | 6/1991 | Jansky et al. | 137/588 |
| 5,027,868 | 7/1991 | Morris et al. | 141/59 |
| 5,437,317 | 8/1995 | Takatsuka et al. | 141/312 |

FOREIGN PATENT DOCUMENTS 0 320 643  6/1992  European Pat. Off. .

*Primary Examiner*—J. Casimer Jacyna
*Attorney, Agent, or Firm*—Kenyon & Kenyon

[57] ABSTRACT

1. A fuel tank (1) having a filler neck (3) closable by a filling flap (2), the volatile fuel components (5) located in free space (4) of the fuel tank (1) being able to be fed into a storage chamber (7) filled with an absorption element (6), including a vent line (8) that connects the free space (4) to the storage chamber (7) and is closable by a valve (9). The filler neck (3), on the side facing away from the fuel tank (1), has a plug fitting (10) with a valve support (11). The valve (9) includes a sealing flap (12), the sealing flap (12) and the filling flap (2) forming components of the valve support (11), each being able to pivot about a shaft (13,14), and, being acted upon by spring tension, each being able to be placed against a valve seat (15,16) in the valve support (11). The sealing flap (12) and the filling flap (2) are mechanically coupled by a driving device (17) and are able to be forced jointly into the open position by inserting a gas hose nozzle (18) through the filling flap (2) into the filler neck (3).

15 Claims, 5 Drawing Sheets

FUEL TANK

FIELD OF THE INVENTION

The present invention relates to a fuel tank having a filler neck closable by a filling flap, the volatile fuel components located in the free space of the fuel tank being able to be fed into a storage chamber filled with an absorption element, including a vent line that connects the free space to the storage chamber, and is closable by a valve.

BACKGROUND INFORMATION

Such a fuel tank is known from the European Patent No. 0 320 643. The fuel tank is provided with a trapping device, arranged in its filler neck, for collecting fuel vapors when refueling. The filling flap is transferred into the open position, as soon as the filling pipe of a gas hose nozzle is inserted into the filler neck. In the previously known fuel tank, the filling flap at the same time forms the valve body of the valve, which is arranged between the fuel tank and an active carbon filter for sealing the vent line.

SUMMARY OF THE INVENTION

An object underlying the present invention is to further develop a fuel tank of the type indicated at the outset in such a way, that the opening characteristics of the valve as a function of the opening characteristics of the filling flap can be better adapted to the respective conditions of the application case.

Provision is made within the framework of the present invention that the filler neck, on the side facing away from the fuel tank, has a plug fitting with a valve support, that the valve includes a sealing flap, that the sealing flap and the filling flap form components of the valve support, are each able to swivel about a shaft, and, being acted upon by spring tension, are each able to be placed against a valve seat in the valve support. The sealing flap and the filling flap are mechanically coupled by a driving device and are able to be forced jointly into the open position by inserting a gas hose nozzle through the filling flap into the filler neck. The fuel tank of the present invention is provided to reduce evaporative emissions to the environment to the greatest extent possible when being refueled. To that end, the volatile fuel components developing during refueling are fed through the valve and the vent line contiguous to it, into the storage chamber filled with the absorption element. For example, the absorption element can be an active carbon filter. The volatile fuel components stored in the storage chamber are fed to the connected combustion engine during its operation as a function of the respective load state; in this manner, the storage chamber is regenerated. When inserting a gas hose nozzle through the filling flap into the filler neck, the filling flap is forced mechanically against the spring tension into the open position. By opening the filling flap, the driving device also causes the sealing flap to be lifted from its valve seat and forced into the open position. The refinement of the driving device is decisive for the opening characteristics of the sealing flap as a function of opening the filling flap.

The valve seat of the sealing flap is constructed as a sealing seat, the sealing flap, on the side facing the sealing seat, having a sealing ring made of elastomeric material, and the sealing flap being able to be placed sealingly against the sealing seat. The tightly closing valve flap prevents fuel from reaching the active carbon filter in the event of a vehicle roll-over. During operation, volatile components can escape from the tank via the valve flap. In the fuel tank of the present invention, only the valve seat of the sealing flap is designed as a sealing seat, while the filling flap deliberately does not abut tightly against its valve seat. Because the filling flap does not close tightly, there is the possibility, on one hand, to allow a run-off of residual fuel from the refueling back into the fuel tank, and, on the other hand, not to impair the functioning of the overpressure and underpressure safety valves located in the tank cover.

Outside of the refueling operation, the sealing flap must be closed, in order to prevent liquid fuel, both during the travel operation and in the event of a vehicle roll-over, from getting through the valve and the vent line into the storage chamber, provided with a ventilation line, and thus into the environment. The ventilation line of the storage chamber is necessary for regenerating the absorption element. To that end, fresh air is sucked through the absorption element and takes along the volatile fuel components in the direction of the combustion engine. The sealing ring of the sealing flap is made of a material resistant to the medium to be sealed.

According to one advantageous refinement of the present invention, the sealing ring has a sealing surface tapering conically in the direction of the sealing seat, and is able to be snapped onto a retaining projection formed in one piece with the sealing flap. Due to the conical design of the sealing ring, it is self-centering—specific to the sealing seat. Due to this, the sealing flap is reliably sealed with respect to the sealing seat during the entire service life of the fuel tank. The driving device is preferably formed by a cam drive, the sealing flap compulsorily being able to be forced into the open position in response to opening the filling flap. To that end, according to one advantageous refinement, the filling flap is provided with a guide cam that is moveably supported in a guide link (coulisse) of the sealing flap. The sealing flap is able to be forced into the open position, relatively delayed with respect to the filling flap. An exceptional feature of the fuel tank according to the present invention can be seen in the fact that the filling flap and the sealing flap are constructed not in one piece, but in two pieces, and are operable, coupled, by way of the driving device. Both flaps have a separate shaft and a separate spring, the springs forcing the respective flaps into the closed position when the gas hose nozzle is removed from the filler neck. The cam drive is designed in such a way that, when the gas hose nozzle is inserted into the filler neck, initially only the filling flap is lifted off from its valve seat. In the event that refueling is already taking place, although the filling flap is not yet completely open, due to the delayed opening, no fuel can get into the line to the storage chamber. It is also of advantage that the sealing flap can center itself on its valve seat, before the filling flap strikes against its seat. At this time, the sealing flap is still in the closed position. After overcoming an idle path, the sealing flap is also lifted off from its sealing seat.

Preferably, the sealing flap is able to swivel by a maximum of 50° relative to the plane of its sealing seat. The opening angle of the sealing flap is selected so as to ensure that no liquid can get from the gas hose nozzle into the vent line, and that, at the same time, the pressure loss of the gas flow through the valve is kept as low as possible, an angle of 50° having proven to be advantageous for the total functioning of the system. Preferably, the side of the sealing flap facing the fuel tank is designed as a coalescer. A pivoting angle of the sealing flap of about 45° ensures an excellent separating effect of liquid fuel components located in the escaping gasoline vapor. The separation of liquid fuel components is very important, since all liquid components reaching the absorption element in the storage chamber contribute to a high degree to reducing its absorption power for vapors. By designing the sealing flap as a coalescer, it is possible to dispense with a separate coalescer. Because of this, the fuel tank according to the present invention has a comparatively simple construction, and is able to be produced cost-effectively.

The maximum pivoting angle of the sealing flap is preferably reached when the pivoting angle of the filling flap is 45 to 60° relative to the plane of the valve seat. The pivoting angle of the sealing flap is essentially constant after reaching its maximum, and further opening of the filling flap.

Due to such a dimensioning of the curved path of the driving device, following the lifting of the filling flap from its valve seat, a very rapid opening of the sealing flap is achieved up to its maximum pivoting angle. During the further insertion of the gas hose nozzle into the filler neck and complete opening of the filling flap, the pivoting angle of the filling flap then being at least 90°, the pivoting angle of the sealing flap remains essentially constant. The advantage here is that the pivoting angle of the sealing flap is essentially independent of the insertion depth of the gas hose nozzle into the filler neck, since the sealing flap already reaches its maximum pivoting angle when the filling flap is only partially open.

The shafts about which the flaps are able to pivot are each arranged radially outside of the valve seats. Such a design results in a simple realization of a cam drive.

The springs are preferably hairpin springs, the spring of the sealing flap exhibiting a greater restoring force than the spring of the filling flap. Due to the comparatively strong spring, acting on the sealing flap, the elastomeric sealing ring is pressed with comparatively great contact pressure against the sealing seat, in order, apart from the refueling operation, to assure a reliable sealing of the fuel tank in the direction of the vent line and of the adjacent storage chamber. On the other hand, the spring of the sealing flap can be constructed to be comparatively weaker, since a hermetic sealing of the fuel tank with respect to the surroundings is assured by the tank cover closing the filler neck.

The valve support, the flaps, the shafts and the springs form a unit that can be preassembled. The modular type of construction offers the possibility of checking the preassembled unit for proper functioning of the components before mounting the valve support on the plug fitting. This is an advantage to be emphasized, in view of efficient production.

The filling flap is subject to a stronger mechanical stress by the gas hose nozzle, by which it is opened to fill up the fuel tank. Therefore, the filling flap is made preferably of an abrasion-resistant, polymer material. The two-piece construction of the sealing flap and filling flap makes it possible to adapt the respective material to the conditions of the application case without difficulty.

If a gas-hose-nozzle seal is used, it is advantageous that this seal seals off the tank system with respect to the surroundings upon insertion of the gas hose nozzle, before the filling flap, which likewise seals off relatively tightly, is pushed open. This results in a reduction of emissions during refueling.

DETAILED DESCRIPTION

Figure 1:
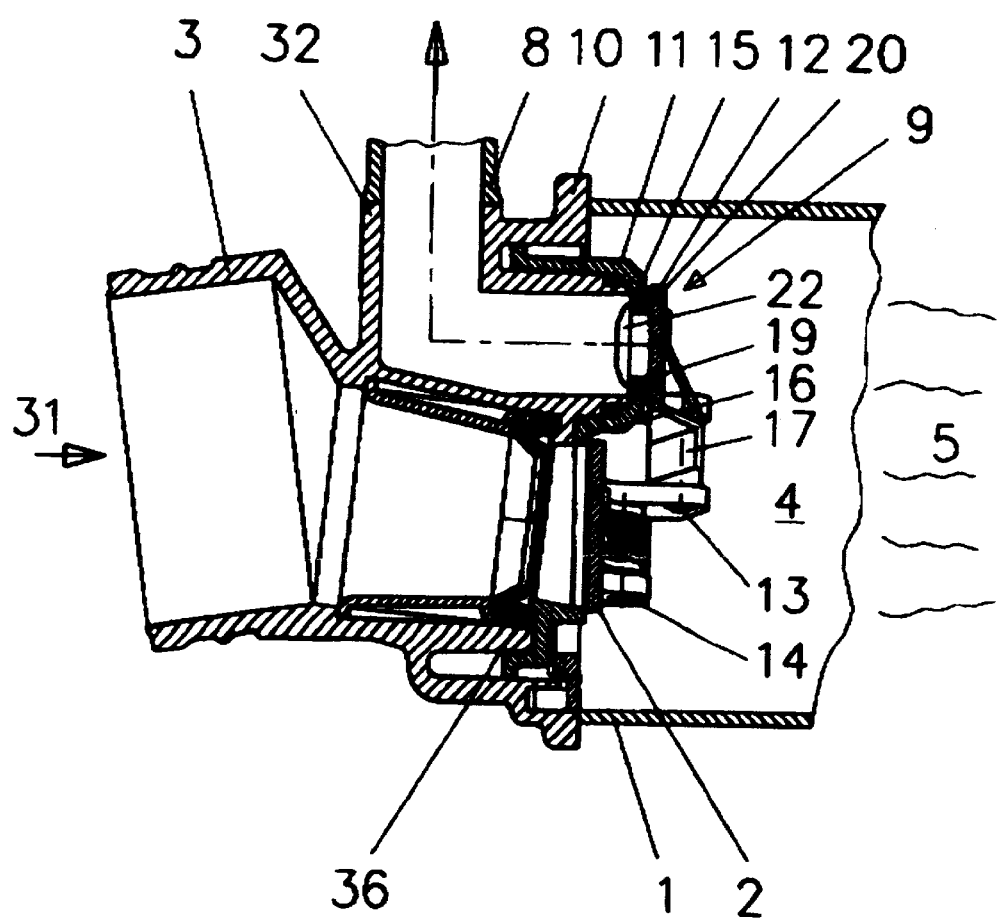
FIG. 1 shows an exemplary embodiment according to the present invention of a valve support that is joined to a plug fitting.

FIG. 1 shows a valve support 11 joined sealingly to a plug fitting 10. Valve support 11, just as sealing flap 12, is made of polyoxyethylene, POM, while filling flap 2 is made of relatively more wear-resistant polyamide, PA. Plug fitting 10 forms the front-side termination of filler neck 3 of a fuel tank. Both sealing flap 12 and filling flap 2 are shown in the closed state.

Plug fitting 10 is provided with a coupling flange 32 for vent line 8, through which coupling flange, volatile fuel components 5 from free space 4 of fuel tank 1 are able to be fed into a storage chamber, not shown here, provided with an active carbon filter. Sealing flap 12 and filling flap 2 are supported on valve support 11 in a manner that they are each able to swivel about their shaft 13, 14, and are acted upon by spring tension, spring 29 of sealing flap 12 exhibiting a greater restoring force than spring 30 of filling flap 2. Both valve seat 15 of sealing flap 12, and valve seat 16 of filling flap 2 form an integral component of valve support 11, only valve seat 15 of sealing flap 12 being constructed as sealing seat 19. Sealing flap 12 and filling flap 2 are mechanically coupled by a driving device 17 constructed as a cam drive, and upon insertion of a gas hose nozzle 18 through filling flap 2 into filler neck 3, are able to be forced jointly into the open position. Sealing flap 12 has a retaining projection 22, upon which a sealing ring 20, made of elastomeric material, is able to be snapped. Sealing ring 20 is tapered conically in the direction of sealing seat 19. This allows a self-centering of sealing flap 12 relative to sealing seat 19. Valve support 11, flaps 12,2, shafts 15,16 and springs 29,30 form a unit that can be preassembled and checked for its operativeness before being joined to plug fitting 10.

Figure 2:
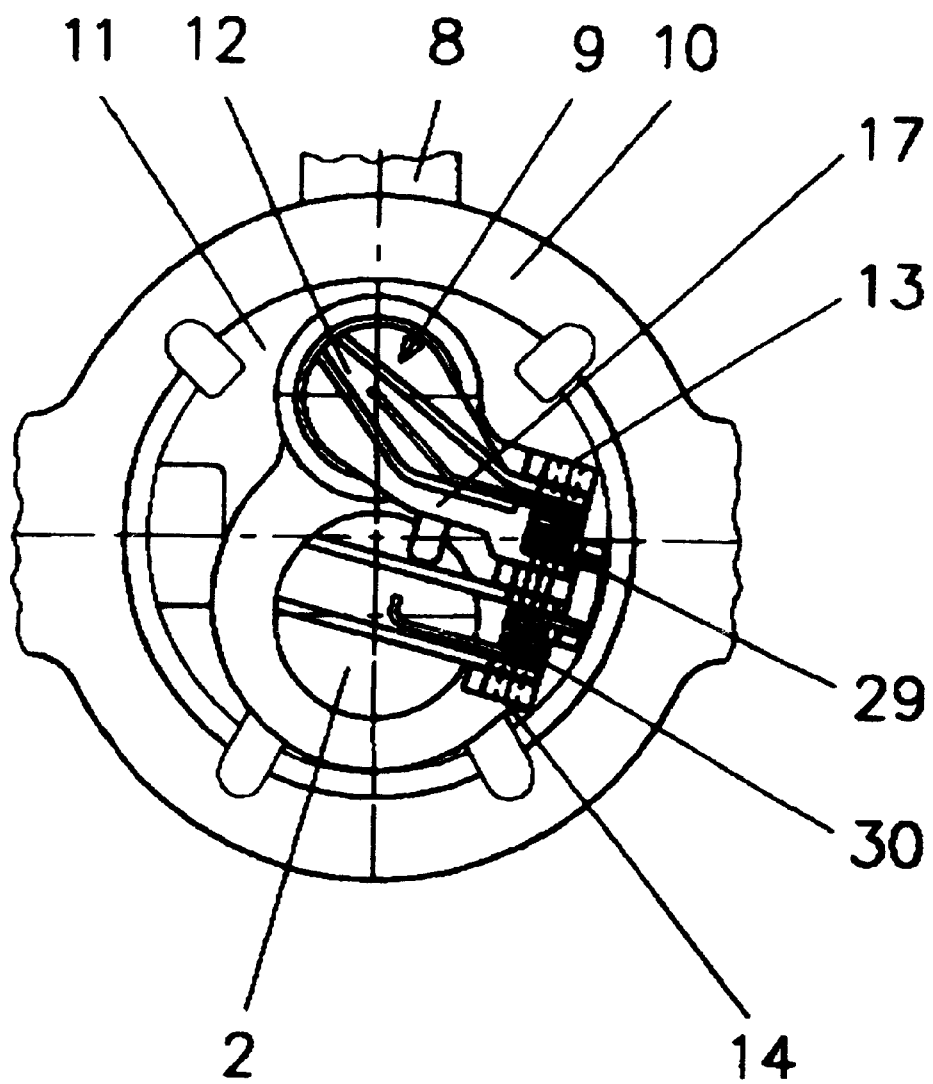
FIG. 2 shows a view of the valve support of FIG. 1, from the direction of the filler neck.

FIG. 2 shows a view of valve support 11 from the direction of filler neck 3. Filling flap 2 and sealing flap 12 are each pressed by a spring 30,29, constructed as hairpin springs, against the valve seat, lying in each case below the drawing plane. To attain a reliable sealing of sealing flap 12 during the entire service life, spring 29 is designed to be stiffer than spring 30 of filling flap 2.

Figure 3:
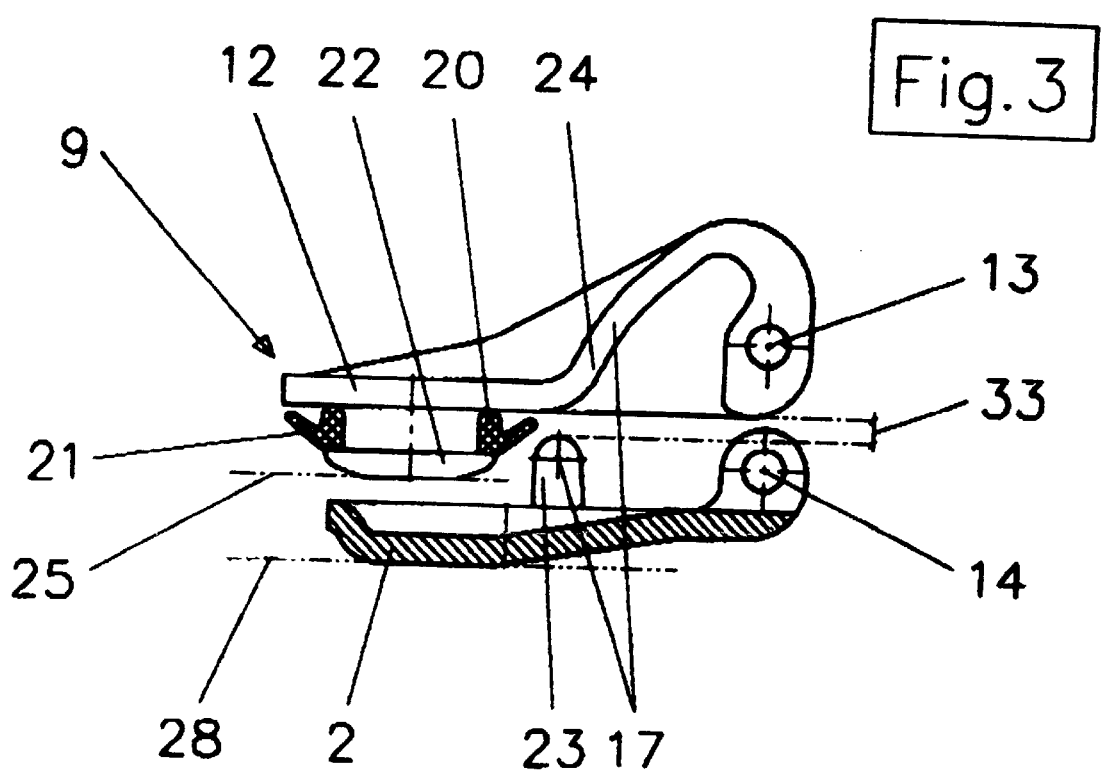
FIG. 3 shows the sealing flap and the filling flap as separate parts in the closed position.

FIG. 3 shows the relative allocation of filling flap 2 to sealing flap 12, each in the closed state. Driving device 17 is a cam drive, an opening of filling flap 2 compulsorily causing sealing flap 12 to open. Filling flap 2 is provided with an integrally molded guide cam 23 that is shiftably guided in guide link 24, designed as a curved path, of sealing flap 12. The idle path that filling flap 2 must overcome during its opening, until guide cam 23 is able to be forced into engagement with guide link 24, is provided with reference numeral 33 in the drawing. The idle path is necessary, in order to continually attain a reliable sealing of sealing flap 12 with respect to sealing seat 19. If, in the closed position of filling flap 2 and sealing flap 12, guide cam 23 would already abut against guide link 24, slight impurities in this area, for example, would already be sufficient to reduce the pressure of sealing ring 20 on sealing seat 19, which can lead to permeability in this region, and the possibility that liquid fuel components will get from fuel tank 1, through valve 9 and vent line 8, into absorption element 6 of storage chamber 7, and disadvantageously influence its absorption power for volatile fuel components.

Figure 4:
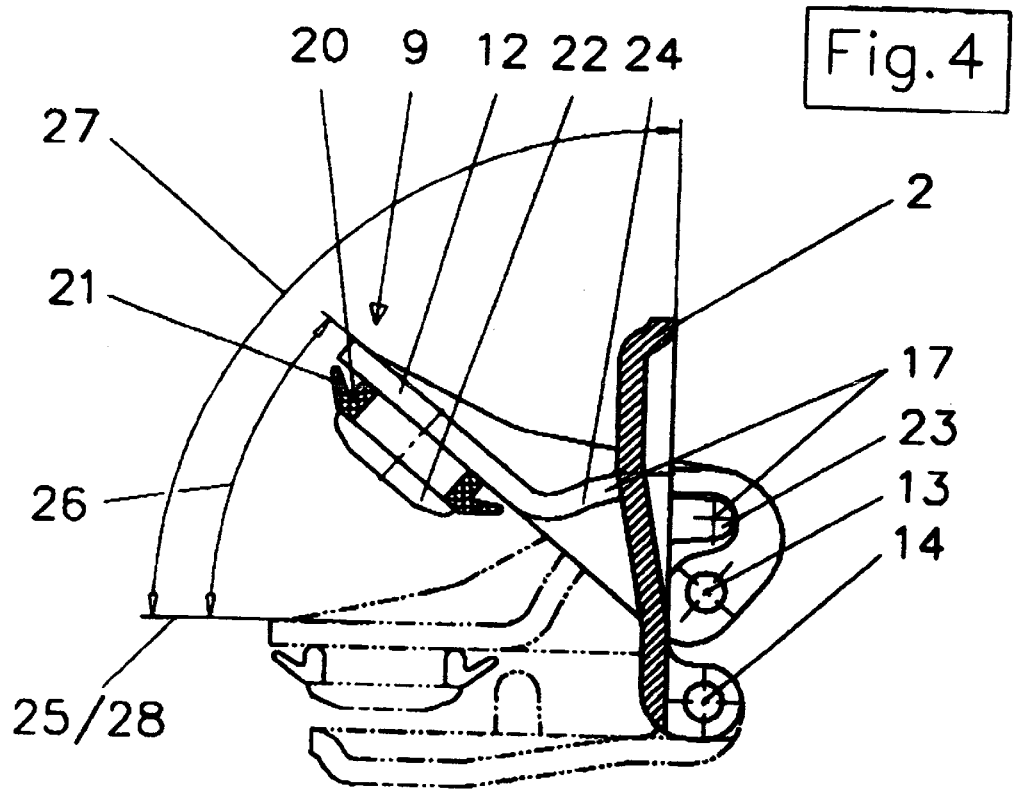
FIG. 4 shows the sealing flap and the filling flap from FIG. 3, each in the open position.

FIG. 4 shows filling flap 2 and sealing flap 12 in the open position. In this exemplary embodiment, the maximum pivoting angle of sealing flap 12 relative to plane 25 of sealing seat 19 is 40°. This maximum pivoting angle is already achieved when pivoting angle 27 of filling flap 2, relative to 28 of the valve seat, in this exemplary embodiment is 50°. The pivoting angle of sealing flap 12 no longer changes in response to an enlargement of pivoting angle 27 from 50° to 90°, shown in this Figure.

Figure 5:
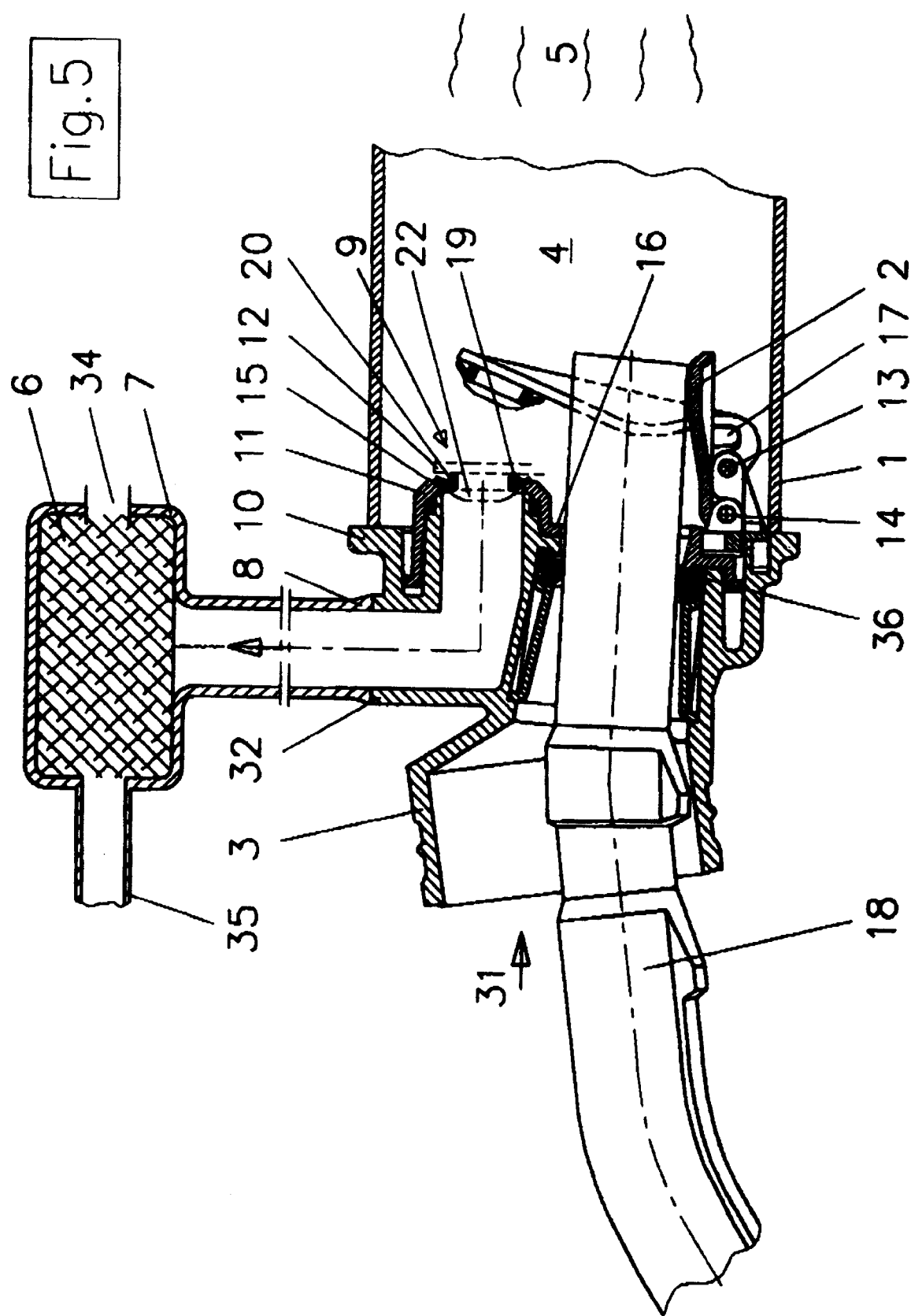
FIG. 5 shows a schematic representation of the fuel tank and its connection to a storage chamber.

Shown schematically in FIG. 5 is the refueling of fuel tank 1 of the present invention. To refuel fuel tank 1, first of all a tank cover, not shown here, is removed from plug fitting 10, the tank cover having an overpressure and underpressure valve, and hermetically sealing the fuel tank during the operation of the associated combustion engine. Subsequently, gas hose nozzle 18 is inserted into plug fitting 10, filling flap 2 being transferred into the open position due to the insertion of gas hose nozzle 18 into filler neck 3. When filling flap 2 forms a pivoting angle of 50°, relative to its valve seat 16, sealing flap 12 is already completely open and has a pivoting angle of 40°, relative to its closed position. If—as shown here—gas hose nozzle 18 is inserted as far as possible into filler neck 3, filling flap 2 is pivoted by 90°—relative to its closed position. Volatile fuel components 5, located in free space 4 of the tank installation, go past sealing flap 12 and sealing seat 19, through coupling flange 32, into vent line 8, and from vent line 8, into storage chamber 7, shown schematically, which is filled with an absorption element 6, constructed as an active carbon filter. To regenerate absorption element 6, the storage chamber is provided with a ventilation line 34, and has a line 35 for the feed of volatile fuel components, the line opening through into the intake manifold of a combustion engine, not shown here. Gas hose nozzle 18 is sealed off on the peripheral side towards the surroundings during the refueling by a seal 36, made of elastomeric material, arranged in plug fitting 10.

We claim:

1. A fuel tank having a free space, the fuel tank comprising:
    a filling flap including a guide cam;
    a filler neck capable of being closed by the filling flap and including a plug fitting and a valve support located on a side of the filler neck facing away from the fuel tank, wherein the valve support includes at least one valve seat;
    a storage chamber filled with an absorption element and into which a volatile fuel component is supplied;
    at least one shaft;
    a driving device;
    a valve including a sealing flap, the sealing flap including a guide link; and
    a vent line capable of being closed by the valve and for connecting the free space and the storage chamber, wherein:
        the sealing flap and the filling flap serve as components of the valve support,
        each one of the sealing flap and the filling flap is capable of swiveling about the at least one shaft,
        each one of the sealing flap and the filling flap is capable of being placed against the at least one valve seat when under an influence of a spring tension,
        the sealing flap and the filling flap are mechanically coupled by the driving device,
        when the filling flap and the sealing flap are each in a closed position, the guide cam and the guide link are separated from each other by a distance, and
        each one of the sealing flap and the filling flap is capable of being jointly forced into an open position by an insertion of a gas hose nozzle through the filling flap into the filler neck.

2. The fuel tank according to claim 1, wherein:
    one of the at least one valve seat is formed as a sealing seat,
    the sealing flap includes, on a side thereof facing the sealing seat, a sealing ring made of an elastomeric material and capable of being placed in a sealing arrangement against the sealing seat.

3. The fuel tank according to claim 2, wherein:
    the sealing ring includes a sealing surface that tapers conically in a direction of the sealing seat and is capable of being snapped onto a retaining projection integrally formed with the sealing flap.

4. The fuel tank according to claim 1, wherein:
    the driving device includes a cam drive, and
    the sealing flap is capable of being forced into the open position in response to an opening of the filling flap.

5. The fuel tank according to claim 1, wherein:
    the guide cam is moveably guided in the guide link.

6. The fuel tank according to claim 1, wherein:
    the forcing of the sealing flap into the open position is delayed with respect to the forcing of the filling flap into the open position.

7. The fuel tank according to claims 1, wherein:
    the sealing flap is capable of pivoting by a maximum pivoting angle of 50° relative to a plane of the sealing seat.

8. The fuel tank according to claims 7, wherein:
    the maximum pivoting angle of the sealing flap is reached when a pivoting angle of the filling flap is within a range of 45 to 60° relative to a plane of one of the at least one valve seat.

9. The fuel tank according to claim 7, wherein:
    after a pivoting angle of the sealing flap reaches the maximum pivoting angle and an opening of the filling flap occurs, the pivoting angle of the sealing flap remains essentially constant.

10. The fuel tank according to claim 1, wherein:
    a side of the sealing flap facing the fuel tank is formed as a coalescer.

11. The fuel tank according to claim 1, wherein:
    the at least one shaft includes a plurality of shafts,
    the at least one valve seat includes a plurality of valve seats, and
    each one of the plurality of shafts is arranged radially outside a corresponding one of the plurality of valve seats.

12. The fuel tank according to claim 1, further comprising:
    a plurality of springs, each one of the plurality of springs being formed as a hairpin spring, wherein:
        one of the plurality of springs is associated with the sealing flap,
        another one of the plurality of springs is associated with the filling flap, and
        the spring associated with the sealing flap exhibits a restoring force that is greater than a restoring force exhibited by the spring associated with the filling flap.

13. The fuel tank according to claim 12, wherein the valve support, the sealing flap, the filling flap, the at least one shaft, and the plurality of springs form a unit capable of being preassembled.

14. The fuel tank according to claim 1, wherein:
    each one of the plug fitting and the valve support is formed from a polymer material.

15. The fuel tank according to claim 1 wherein:
    a spring tension for urging the filling flap against the at least one valve seat has a magnitude that is greater than a magnitude of a spring tension for urging the sealing flap against the at least one valve seat.

\* \* \* \* \*